July 10, 1923. Re. 15,652
E. WOLTMANN
OPERATOR'S OUTFIT FOR ELECTRIC WELDING
Original Filed May 1, 1915 3 Sheets-Sheet 1
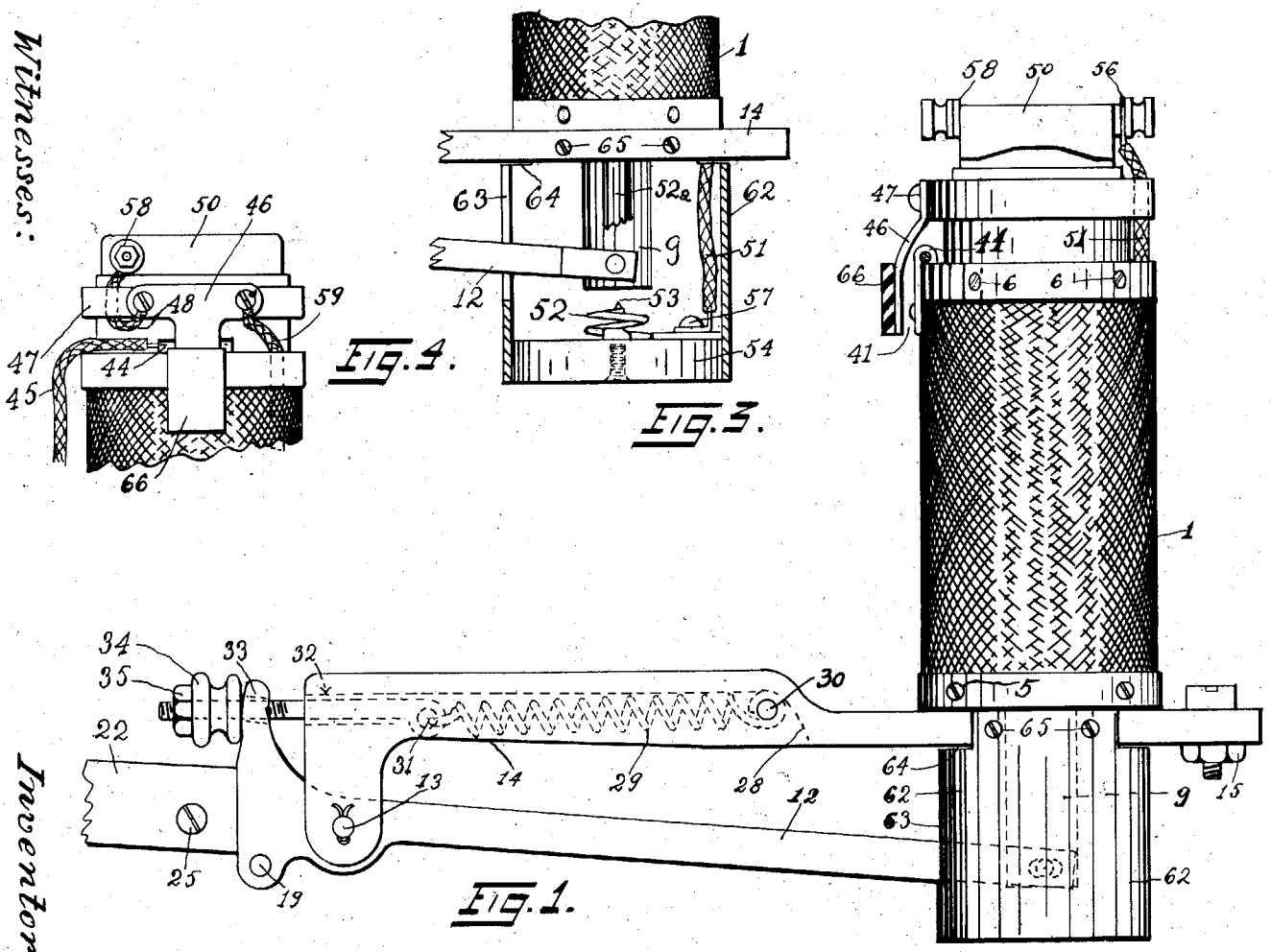
Witnesses:
L. C. Badeau
H. D. Penney
Inventor;
Ernst Woltmann,
By his Atty, F. H. Richards.

July 10, 1923. Re. 15,652
E. WOLTMANN
OPERATOR'S OUTFIT FOR ELECTRIC WELDING
Original Filed May 1, 1915 3 Sheets-Sheet 2
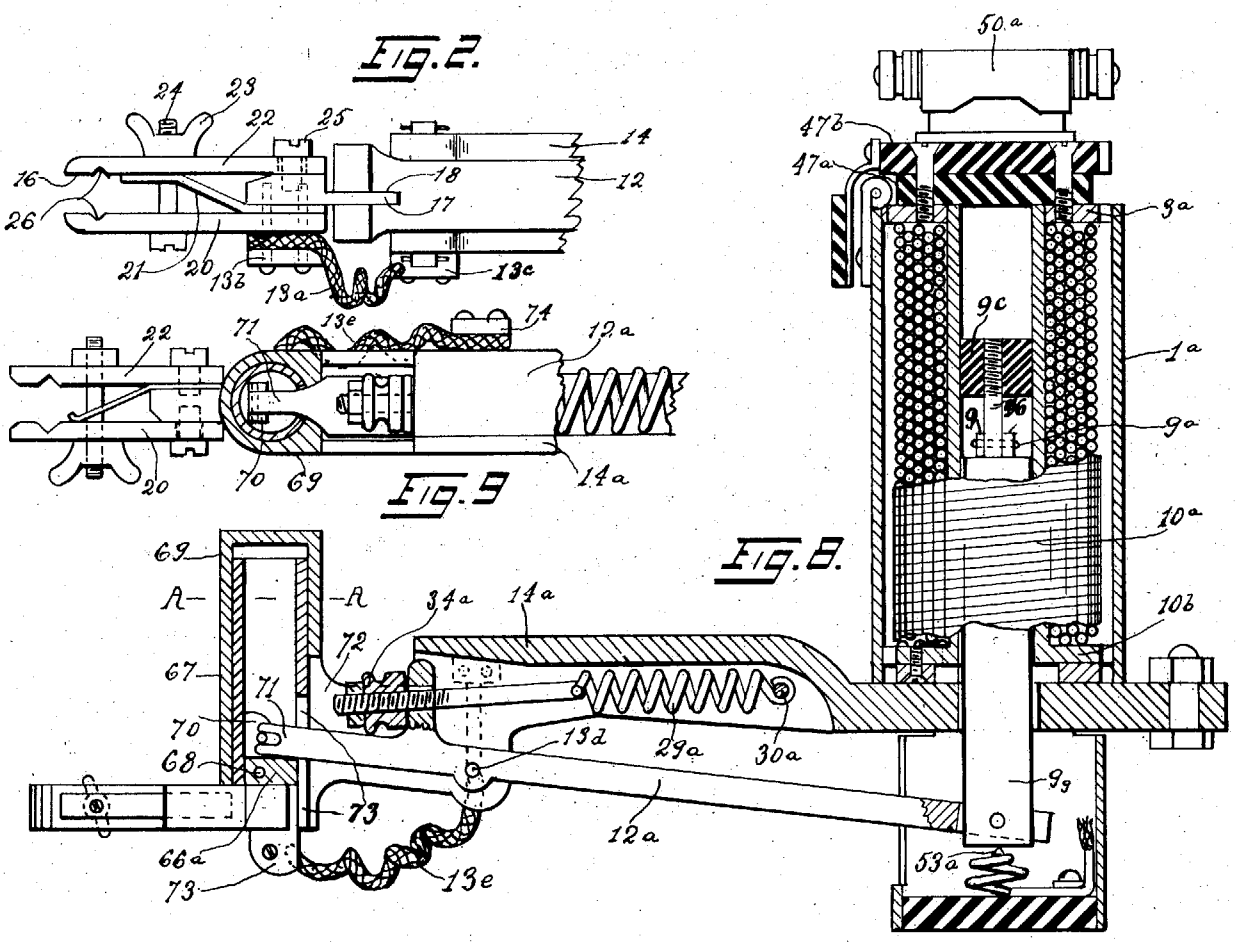
Witnesses:
L. C. Badeau
H. D. Penney
Inventor:
Ernst Woltmann,
By his Atty, F. H. Richards.

July 10, 1923. Re. 15,652

E. WOLTMANN

OPERATOR'S OUTFIT FOR ELECTRIC WELDING

Original Filed May 1, 1915 3 Sheets-Sheet 3

Witnesses:
L. C. Badeau
H. D. Penney

Inventor:
Ernst Woltmann,
By his Atty, F. H. Richards.

Reissued July 10, 1923.

Re. 15,652

UNITED STATES PATENT OFFICE.

ERNST WOLTMANN, OF NEW YORK, N. Y.

OPERATOR'S OUTFIT FOR ELECTRIC WELDING.

Original No. 1,284,529, dated November 12, 1918, Serial No. 25,179, filed May 1, 1915. Application for reissue filed December 31, 1919. Serial No. 348,682.

*To all whom it may concern:*

Be it known that I, ERNST WOLTMANN, citizen of the United States, and resident of New York, in the county of New York and State of New York, have invented certain new and useful Improvements in Operators' Outfits for Electric Welding, of which the following is a specification.

The object of my invention is an operator's outfit or hand tool by means of which an inexperienced operator may repair or join metal portions by means of an electric arc and welding terminal means adapted to deliver molten metal to the arc which in turn carries it to the metal portion to be welded or repaired so organized as to cause the arc to have a fixed voltage and amperage and therefore a fixed heat, to secure an even flow of welding metal.

In the drawings:

Figure 1 is a side elevation of my hand tool with a small portion broken away.

Fig. 2 is a bottom view of the clip, a portion of which is broken away in Fig. 1.

Fig. 3 is a view partly in section of the bottom of the solenoid shown in Fig. 1.

Fig. 4 is a detail.

Fig. 8 shows a sectional elevation of a preferred form of construction.

Fig. 9 is a plan view of same on line A A, Fig. 8.

Figure 6:
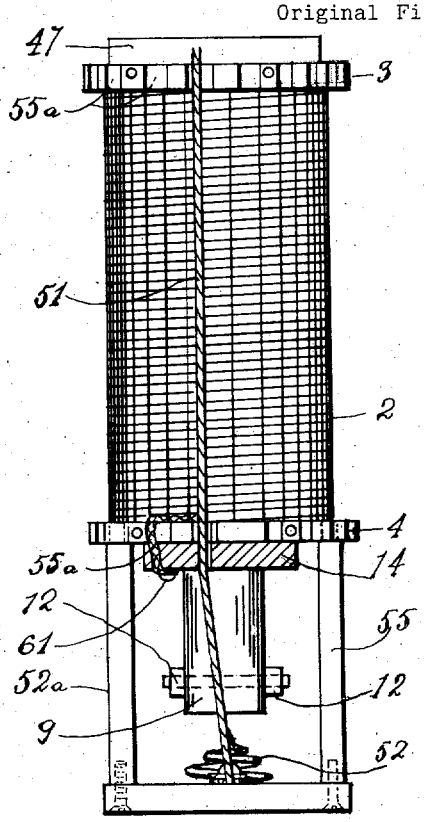
Fig. 6 is a rear view with portions removed.
Figure 5:
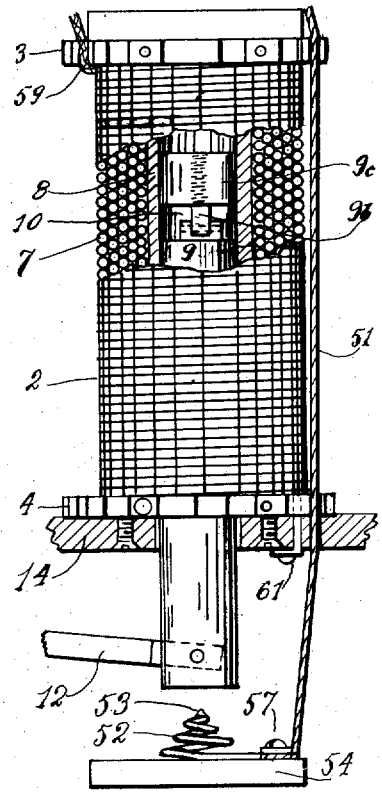
Fig. 5 is a side elevation partly in section showing further details.

In my operator's outfit, or hand tool I employ a handle 1 which may be a hollow cylinder of metal with a chased or engraved surface to enable the hand to grasp it easily without slipping. Within the cylinder 1 is secured a solenoid 2 shown in Figs. 5 and 6. The cylinder 1 is secured to the ends 3 and 4 of the solenoid magnet by means of screws 5 and 6. The solenoid is provided with a winding covering a spool 8, hollow to form a dash-pot chamber 10 to receive the armature or core 9 of the solenoid which is adapted to reciprocate sluggishly within the chamber 10. The core 9 is linked by means of the lug $9^a$ to the pin $9^b$ secured to a plunger $9^c$ operating in the chamber 10, said plunger and chamber forming a dash-pot, air being allowed to seep by the plunger in slight quantities because of intentional loose fit of the plunger in the chamber 10, or such seeping of air may be accomplished by such other means appurtenant to the plunger and chamber as may be adapted for this purpose, said plunger being of carbon or graphite. This renders the action of the core sluggish and overcomes its tendency under the spring 29 to tremble or vibrate rapidly. The movable core 9 is pivoted to a lever 12 shown in Fig. 1 which in turn is pivoted at 13 in the bracket 14 which is secured to the bottom flange 4 of the solenoid spool as shown in Fig. 6. This bracket is provided with a nut or other binding post 15 adapted to be connected with a main line conductor for the purpose of supplying current thereto for welding purposes.

Upon the end of the lever 12 is secured a spring clip 16 more clearly shown in bottom view in Fig. 2. This clip is composed of the block of metal 17 having a tongue 17′ adapted to fit the slot 18 in the end of the lever 12. A screw 19 passes through the end of the lever and binds the cleft portion upon the tongue 17 securely uniting them together. Upon the block is also fixedly secured the clip member 20. This is stationary and between it and the block is secured the spring 21 tending to separate the clips. The other clip member 22 is loosely secured to the block by means of the wing nut 23 and screw 24 and is held from getting out of position by means of the pin 25 fixed to the block and loosely passing through a hole in the clip member 22. The two clip members 20 and 22 are provided with suitable means, which may be indentations such as 26, for holding a welding terminal means, which may be a pencil of welding metal such as the member 27. The clip 22 is electrically connected to the lever 12 by suitable means, such as the flexible stranded copper connection $13^a$, one end secured under the plate $13^b$ fastened securely to the clip 20 and the other end soldered to the block $13^c$ secured by screws to the bracket 14.

The bracket 14 is hollowed out as indicated by the broken line 28 so that it will contain the spring shown in broken line 29, one end of which is secured to a fixed pin 30 passing through the bracket and the other end of which is secured to the end of a screw 31 which passes loosely through the aperture 32 and through the heel of the lever 12 shown at 33 and then through a thumb nut 34 bearing against the heel and binding nut 35 so that the spring may be adjusted as to its tension. The spring 29 opposes the force of the solenoid 2. When the solenoid draws the core 9 into itself, it extends the spring 29. This spring is so located that it is not materially altered in its tension by the maximum motion of the core 9.

The nearer the screw 31 is to the pivot 13, the less will be the variation in tension of the spring 29. The point of application of the spring tension to the lever is such that as the spring is stretched and its tension increased the point of application approaches a line drawn from the pivot 30 through the fulcrum, thereby reducing the leverage effect of the spring upon the compensating lever. Suitable proportions will result in such a balance between the reduction of the leverage and the increase of the tension. Thus the tension of the spring 29 upon the lever is not materially varied by the maximum variation in position of the core 9 of the solenoid. The core is loosely fitted within the spool of the solenoid and the pivots 9ª are loose to provide freedom of action for the core.

The spring 29 is so arranged as to draw the welding terminal means or pencil away from the work. The core of the solenoid on the contrary is so arranged as to draw the welding terminal means or pencil toward the work.

Figure 7:
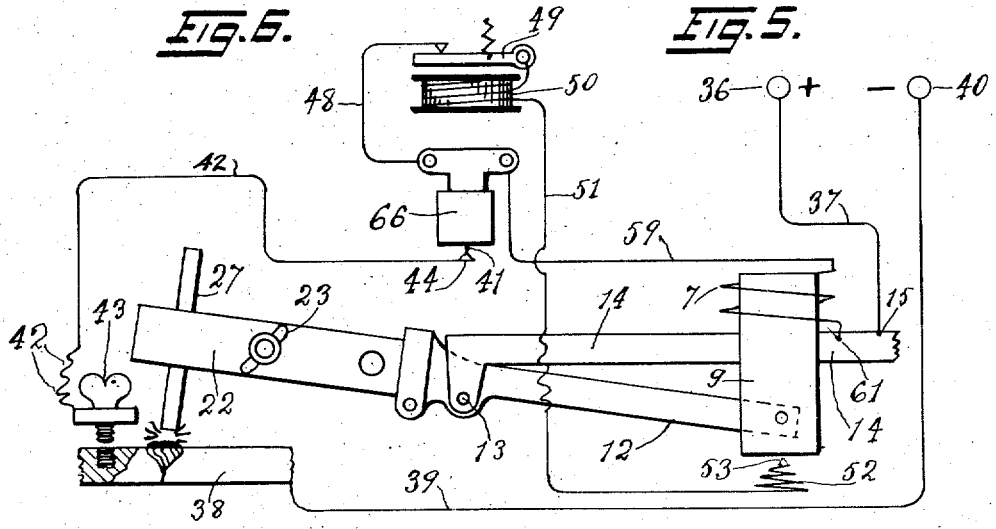
Fig. 7 is a diagram of the circuits of my invention.

The circuits are shown in Fig. 7. The main welding circuit may be traced from the binding post 36 by way of the conductor 37 to the bracket 14 thence through the pivot 13 or connection 13ª around the post to the lever 12 and clip 22, and then through the welding pencil 27 which is brought sufficiently close to the work 38 as to form an arc. The current then returns by way of the conductor 39 to the source of supply binding post 40. The circuit or coil 7 of the solenoid is connected on one side to the conductor 37 and on the other side to a push button switch 41 normally open but adapted to be closed by the operator's finger when he grasps the cylinder 1, to establish a circuit through the conductor 42 to a terminal means adapted to be connected temporarily to the work 38, or as shown connected to the threaded member 43, which may be temporarily attached to the work 38, the purpose of such connecting means or terminal member being to establish a shunt circuit to supply a current to the coil 7 of the solenoid. This shunt is carried across the arc from one side of the circuit to the other. It is open until the operator closes the switch 41. This is a convenient thing to do since it is located upon the tool itself as shown in Fig. 1. In this figure this switch is shown to be composed of a clip 44 connected as shown in Fig. 4 to the flexible conductor 45 which in turn is connected to the terminal 43 as shown in Fig. 7. The other side of this switch is composed of a clip or spring 46 mounted upon the block of insulating material 47 which is secured to the top of the solenoid and the circuit is led from this clip 46 in two directions, one to the solenoid as heretofore described and the other by means of a conductor 48 to the contact 49 of the buzzer thence through the coil 50 of the buzzer and the conductor 51 to a spiral spring 52 carrying at its top a contact 53 adapted to come into electrical connection with the core 9 and thereby establish a connection with the bracket 14 and thus enable current to pass through the buzzer from the conductor 37 to the clip 46 in shunt of the coil 7 of the solenoid.

This circuit and buzzer are for the purpose of informing the operator that his tool has been brought too close to the work and there is not sufficient room for the necessary variations of the welding terminal means by means of the solenoid. When the operator hears the signal or buzzer, he lifts his tool slightly so that the contact 53 and the core 9 are separated and thereafter his welding goes on as before. An audible signal is of particular value in this connection since during the operation of welding the operator usually observes his arc through smoked glass which is so dark that he is unable to see much else. A signal which would be visible ordinarily would be invisible through the glass so that some other sort of signal is advisable to inform him when his tool is not held at the proper distance from the work. The contact 53 and the spring 52 are located upon a block of insulating material 54 which is supported by posts 55 upon the bottom of the solenoid 4. The conductor 51 is shown in Figs. 1, 3 and 6. These figures show how the conductor is concealed between the outside of the solenoid coil and within the cylindrical cover or handle 1.

While, as has been stated, an audible signal is advisable, it should be understood that I do not restrict myself to an audible signal but that the signal may be of any kind suitable to give warning to the operator, and adapted and arranged to become operative by the too near approach of the tool to the work.

The flanges 3 and 4 of the solenoid are provided with slots or cut-out portions 55ª through which the wire 51 is adapted to pass in order that it may be concealed within the cylindrical handle. Upon the top of the solenoid is an insulating block 47 shown in Fig. 1. The upper portion of this block is removed in Figs. 5 and 6. Upon the top of this block which is secured to the spool of the solenoid in any suitable way is mounted the buzzer 50 as shown in Fig. 1 and Fig. 4. In Fig. 1 is shown the connecting conductor 51 leading from a binding post 56 upon the buzzer into the solenoid handle 1. This is shown more clearly in Figs. 5 and 6. This conductor is connected to the binding post 57 upon the block 54 which in turn is connected to the spiral spring 52 and contact 53. The conductor from the other binding post 58 is shown in Fig. 4 and is carried through the edge of the block 47 and connected to the spring clip 46 as shown. The spring clip 46 has also connected to it as shown in Fig. 4, a conductor 59 leading to one end of the solenoid coil 7 as shown at 59 in Fig. 5. The other end of the solenoid coil is carried through the hole in the bracket 14 as shown in Fig. 6 and secured by a proper binding screw 61 to the bracket. Surrounding the mechanism upon the bottom of the solenoid is located the hollow cylinder 62 having suitable cut-out portions 63 for the lever 12, and 64 for the bracket 14. The cylinder is secured to the bracket 14 by means of screws 65 to hold it in place. Before operation, the welding terminal means, or pencil of metal 27, is located between the spring clips 20 and 22. The welding terminal means, or the pencil 27 shown, may be composed of Swedish iron or any alloy of steel that may be desired, or any conductive and fusible metal or material suitable for the purpose. The operator grasps the cylinder 1 and with a finger pushes upon the insulating piece 66 mounted upon the spring clip 46 and presses it into contact with the spring clip 44 thereby closing the pair of contacts 41 and introducing the solenoid into a normally open shunt circuit adapted to be closed by means of the terminal 43 to the work 38. When the latter connection has been established, the operator may bring the welding terminal means or pencil into contact with the work 38 in order that an arc may be drawn. The current that creates the arc travels from the source of supply 36 by way of a conductor 37 to the binding post 15 through the bracket 14 to the lever 12 to the welding terminal means or pencil 27, to the work 38, thence by way of conductor 39 to the other terminal 40 of the source of supply. When the welding terminal means is brought into contact, a part of the current is diverted from the solenoid circuit through the circuit of the welding terminal means thereby reducing the electro-responsive effect of the solenoid which has the effect of releasing the core 9 somewhat so that under the influence of the spring 29 the welding terminal means is drawn away from the work thereby creating an arc. The limits of motion of the core 9 and the strength of the solenoid 7 and the tension of the spring 29 are so adjusted to each other that when the action of drawing the arc takes place, the arc is drawn to the right length for welding purposes. It is drawn rapidly and automatically so that the operator needs no training or skill to enable him to perform this function properly.

The preferred form of my invention is shown in Figs. 8 and 9. In Figs. 1 and 7, the lever and clip which carry the pencil are mounted to swing about the pivot 13. The result of this arrangement is that as the lever 12 vibrates sufficiently under the influence of the spring 29 and the core 9, the end of the welding pencil, where it is nearest the work and from which the arc is drawn, swings along a curve of which the pivot 13 is the center. This action somewhat interferes with the best welding results. My construction shown in Figs. 8 and 9 overcomes this difficulty. In these figures, the welding pencil is so held and manipulated that it approaches the work or retreats from the work in a straight line. This result is accomplished by mounting the block which carries the clip member 20 and 22 within the tube 67 by pinning it as indicated at 68 or by brazing it into the tube or securing it in any other suitable manner. The tube 67 is adapted to slide freely within the tubular housing 69 which forms an extension of the bracket $14^a$. The plug $66^a$ is provided with ears 70 between which the end 71 of the lever $12^a$ is pivoted loosely, the hole in the lever $12^a$ being elongated to give the pivot free play. The lever $12^a$ is pivoted at $13^a$ in the bracket $14^a$. The housing 69 is open as shown at 72 for the purpose of giving the lever $12^a$ free play where it enters the housing and also for the purpose of allowing access to the binding nut $34^a$. The tube 67 is also slotted as shown at 73 for the purpose also of allowing the lever $12^a$ proper freedom of action. The flexible connection $13^a$ is soldered at one end to one of the ears 73 of the plug $66^a$ and the other end is secured as shown in Fig. 9 under the plate 74 which is screwed to the bracket $14^a$ for the purpose of carrying the current from the bracket to the pencil carrying clips.

In other respects, the construction is the same as that in Fig. 1 and the construction shown in Figs. 1, 3, 4, 5 and 6 is shown in section in this Fig. 8. The handle $1^a$ is secured to the spool $10^a$. This spool includes the tubular portion and the bottom flange $10^b$ both being composed preferably of brass. The top flange $3^a$ is preferably made of steel or iron; and secured to the bottom flange is the steel or iron flange 4. These flanges are provided with the cut-out portions heretofore described and allow a free circulation of air within the handle $1^a$ thereby keeping it fairly cool and comfortable to the hand. Secured to the top flange $3^a$ are the two blocks $47^a$ and $47^d$ upon the top of which is mounted the buzzer $50^a$. The play of the core in this figure is approximately the same as that in Fig. 1 and amounts to perhaps an inch. The play of the other end of the lever $12^a$, namely the end 71, amounts to about half that amount. This proportion is found most effective for the regulation of the arc.

In Fig. 8 the core $9^g$ is shown in contact with the contact point $53^a$, the lever being in the extreme position. When the circuit of the solenoid is closed however, the core is instantly brought up to its proper position where the force of the solenoid balances the tension of the spring $29^a$.

The operation of the construction in this figure is evident, the chief difference from the operation of construction shown in the other figures being that the welding terminal means or pencil moves in a straight line instead of in the arc of a circle.

In the operation of welding, an operator's hand is, as a rule unsteady and he is unable to prevent variations in the length of the arc due to this unsteadiness.

This fault is more pronounced among operators who are poorly trained and most pronounced with an operator who has had no training.

This fault is corrected by my invention. When such unsteadiness tends to draw the welding terminal means, or pencil, too far from the work, the arc begins to increase in length thereby increasing its resistance and cutting down the current flow across the arc. This has the effect of diverting more current through the solenoid coil which has the effect of exerting a greater pull upon the core 9 thereby approaching the welding terminal means, or the pencil, to the work. The various strengths of the coil and spring are so adjusted as to provide a suitable compensation for this tendency.

When, through the operator's unsteadiness, the welding terminal means, or pencil, tends toward shortening the arc, a greater current starts to flow through the arc owing to its reduced resistance and this has the effect of decreasing the strength of the solenoid pull so that the spring 29 pulls the welding terminal means or pencil correspondingly away from the work.

These variations take place between such narrow limits that for practical purposes, the arc remains steady and uniform and delivers a constant flow of metal from the welding terminal means or pencil to the work thereby avoiding the porosity of the weld which otherwise might occur.

Having thus described my invention, it should be understood that there may be modifications thereof and variations therein without departing from the spirit of my invention or exceeding the scope of the appended claims.

What I claim is:

1. An electric welder comprising, with means for supplying electricity thereto and means for operating the welder, welding terminal means connected to said means for supplying electricity and operatively supported and providing an electrode, terminal means connected to said means for supplying electricity and attachable to the work and providing an electrode, means for moving said welding terminal means to the work when said attachable terminal means is electrically connected to the work, and means for moving said welding terminal means away from the work.

2. An electric welder comprising, with means for supplying electricity thereto and means for operating the welder, welding terminal means connected to said means for supplying electricity and operatively supported and providing an electrode, terminal means connected to said means for supplying electricity and attachable to the work and providing an electrode, means for moving said welding terminal means to the work when said attachable terminal means is electrically connected to the work, and spring actuated means for moving said welding terminal means away from the work.

3. An electric welder comprising, with means for supplying electricity thereto and means for operating the welder, welding terminal means connected to said means for supplying electricity and operatively supported and providing an electrode, terminal means connected to said means for supplying electricity and attachable to the work and providing an electrode, means for moving said welding terminal means to the work when said attachable terminal means is electrically connected to the work, means for moving said welding terminal means away from the work, and means for compensating the movement of said welding terminal means to and away from the work.

4. An electric welder comprising, with means for supplying electricity thereto and means for operating the welder, welding terminal means connected to said means for supplying electricity and operatively supported and providing an electrode, terminal means connected to said means for supplying electricity and attachable to the work and providing an electrode, means for moving said welding terminal means to the work when said attachable terminal means is electrically connected to the work, spring actuated means for moving said welding terminal means away from the work, and means for compensating the movement of said welding terminal means to and away from the work.

5. An electric welder comprising, with means for operating the welder, welding terminal means composed of conductive fusible material electrically connected and operatively supported for providing an electrode, electrically connected terminal means attachable to the work and providing an electrode, electrically energized means operatively arranged for moving said welding terminal means to the work when said attachable terminal means is electrically connected to the work, and means for moving said welding terminal means away from the work.

6. An electric welder comprising, with means for operating the welder, welding terminal means composed of conductive fusible material electrically connected and operatively supported for providing an electrode, electrically connected terminal means attachable to the work and providing an electrode, electrically energized means operatively arranged for moving said welding terminal means to the work when said attachable terminal means is electrically connected to the work, and spring actuated means for moving said welding terminal means away from the work.

7. An electric welder comprising, with means for operating the welder, welding terminal means composed of conductive fusible material and electrically connected and operatively supported for providing an electrode, electrically connected terminal means attachable to the work and providing an electrode, electrically energized means operatively arranged for moving said welding terminal means to the work when said attachable terminal means is electrically connected to the work, means for moving said welding terminal means away from the work, and means for compensating the movement of said welding terminal means to and away from the work.

8. An electric welder comprising, with means for operating the welder, welding terminal means composed of conductive fusible material and electrically connected and operatively supported for providing an electrode, electrically energized means operatively arranged for moving said welding terminal means to the work when said attachable terminal means is electrically connected to the work, spring actuated means for moving said welding terminal means away from the work, and means for compensating the movement of said welding terminal means to and away from the work.

9. An electric welder comprising, with means for supplying electricity thereto and means for operating the welder, welding terminal means of conductive fusible material connected to said means for supplying electricity and operatively supported for providing an electrode, terminal means connected to said means for supplying electricity and attachable to the work and providing an electrode, solenoid means operatively arranged and connected for moving said welding terminal means to the work when said attachable terminal means is electrically connected to the work, and means for moving said welding terminal means away from the work.

10. An electric welder comprising, with means for supplying electricity thereto and means for operating the welder, welding terminal means of conductive fusible material connected to said means for supplying electricity and operatively supported for providing an electrode, terminal means connected to said means for supplying electricity and attachable to the work and providing an electrode, solenoid means operatively arranged and connected for moving said welding terminal means to the work when said attachable terminal means is electrically connected to the work, and spring actuated means for moving said welding terminal means away from the work.

11. An electric welder comprising, with means for supplying electricity thereto and means for operating the welder, welding terminal means of conductive fusible material connected to said means for supplying electricity and operably supported for providing an electrode, terminal means connected to said means for supplying electricity and attachable to the work and providing an electrode, solenoid means operatively arranged and connected for moving said welding terminal means to the work when said attachable terminal means is electrically connected to the work, means for moving said welding terminal means away from the work, and means for compensating the movement of said welding terminal means to and away from the work.

12. An electric welder comprising, with means for supplying electricity thereto and means for operating the welder, welding terminal means of conductive fusible material connected to said means for supplying electricity and operably supported for providing an electrode, terminal means connected to said means for supplying electricity and attachable to the work and providing an electrode, solenoid means operatively arranged and connected for moving said welding terminal means to the work when said attachable terminal means is electrically connected to the work, spring actuated means for moving said welding terminal means away from the work, and means for compensating the movement of said welding terminal means to and away from the work.

13. An electric welder comprising, with means for supplying electricity thereto and means for operating the welder, welding terminal means of conductive fusible material connected to said means for supplying electricity and operably supported for providing an electrode, terminal means connected to said means for supplying electricity and attachable to the work and providing an electrode, solenoid means operatively arranged and connected for moving said welding terminal means to the work when said attachable terminal means is electrically connected to the work, said solenoid means comprising a sluggishly operating plunger, means for moving said welding terminal means away from the work, and means for compensating the movement of said welding terminal means to and away from the work.

14. An electric welder comprising, with means for supplying electricity thereto and means for operating the welder, welding terminal means of conductive fusible material connected to said means for supplying electricity and operatively supported for providing an electrode, terminal means connected to said means for supplying electricity and attachable to the work and providing an electrode, solenoid means operatively arranged and connected for moving said welding terminal means to the work when said attachable terminal means is electrically connected to the work, said solenoid means comprising a plunger having air-seeping means appurtenant thereto for causing sluggish operation of the plunger, spring-actuated means for moving said welding terminal means away from the work, and means for compensating the movement of said welding terminal means to and away from the work.

15. An electric welder comprising, with means for supplying electricity thereto, a hollow cylindrical handle, solenoid means arranged in said handle and comprising a plunger movable in a chamber in said handle and operatively attached to the solenoid core, said core having pivotally attached to the end thereof opposite to said plunger, an arm carrying at an end thereof opposite to said pivotal attachment of the arm to said core a welding terminal member, and said arm being provided with a transversely extending heel, a bracket secured at an end to said handle and pivotally attached at the other end thereof to said arm and provided with a spring operatively connected to said heel, the tendency of said spring being to draw said heel of said arm towards said bracket, means for regulating said tendency of said spring, said bracket being in electric connection with said means for supplying electricity and communicating current therefrom to said arm and thereby to said welding terminal member, terminal means connected to said means for supplying electricity and attachable to the work for establishing a shunt current to the solenoid coil, and means for controlling the supply of electricity to said bracket and to said attachable terminal means.

16. An electric welder comprising, with means for supplying electricity thereto, a hollow cylindrical handle, solenoid means arranged in said handle and comprising a sluggishly movable plunger operating in a chamber in said handle and operatively attached to the solenoid core, said core having pivotally attached to the end thereof opposite to said plunger an arm carrying by clip means at an end thereof opposite to said pivotal attachment of the arm to said core a welding terminal member, said arm being provided with a transversely extending heel, a bracket secured at an end to said handle and pivotally attached at the other end thereof to said arm and provided with a spring operatively connected to said heel, the tendency of said spring being to draw said heel towards said arm, means for regulating said tendency of said spring, said bracket being in electric connection with said means for supplying electricity and communicating current therefrom to said arm and thereby to said welding terminal member, terminal means connected to said means for supplying electricity and attachable to the work for establishing a shunt current to the solenoid coil, and means for controlling the supply of electricity to said bracket and to said attachable terminal means.

17. An electric welder comprising, with means for supplying electricity thereto and means for operating the welder, welding terminal means connected to said means for supplying electricity and operatively supported and providing an electrode, terminal means connected to said means for supplying electricity and attachable to the work and providing an electrode, means for moving said welding terminal means to the work when said attachable terminal means is electrically connected to the work, means for moving said welding terminal means away from the work, and warning means normally inoperative and arranged to become operative by too near approach of said welding terminal means to the work.

18. An electric welder comprising, with means for supplying electricity thereto and means for operating the welder, welding terminal means connected to said means for supplying electricity and operatively supported and providing an electrode, terminal means connected to said means for supplying electricity and attachable to the work and providing an electrode, means for moving said welding terminal means to the work when said attachable terminal means is electrically connected to the work, spring actuated means for moving said welding terminal means away from the work, and warning means normally inoperative and electrically connected and arranged to become operative by too near approach of said welding terminal means to the work.

19. An electric welder comprising, with means for supplying electricity thereto and means for operating the welder, welding terminal means connected to said means for supplying electricity and operatively supported and providing an electrode, terminal means connected to said means for supplying electricity and attachable to the work and providing an electrode, means for moving said welding terminal means to the work when said attachable terminal means is electrically connected to the work, means for moving said welding terminal means away from the work, and audible warning means normally inoperative and arranged to become operative by too near approach of said welding terminal means to the work.

20. An electric welder comprising, with means for supplying electricity thereto and means for operating the welder, welding terminal means connected to said means for supplying electricity and operatively supported and providing an electrode, terminal means connected to said means for supporting electricity and attachable to the work and providing an electrode, means for moving said welding terminal means to the work when said attachable terminal means is electrically connected to the work, and audible warning means comprising a buzzer normally inoperative and electrically connected and arranged to become operative by too near approach of said welding terminal means to the work.

21. In an arc welding system, in combination, a welding pencil subject to the control of an operator's hand and adapted to be brought into contact with a piece of work, a compensating lever carrying said pencil to draw said pencil away from the work, an operator's handle, said operator's handle adapted to approach the pencil to the work, a signal mounted upon said combination and a limiting contact mounted upon said combination adapted to connect electrically with said lever when the combination is brought too close to the work to inform the operator thereof.

22. In an arc welding system, in combination, a welding pencil, subject to the control of an operator's hand and adapted to be brought into contact with a piece of work, a compensating lever carrying said pencil, a resilient device to draw said pencil away from the work, an operator's handle associated with an electro-responsive device to approach the pencil to the work, a signal mounted upon said combination and a limiting contact mounted upon said combination adapted to connect electrically with said lever when the combination is brought too close to the work to inform the operator thereof, said contact being resiliently mounted so as not to interfere with the motion of said lever.

23. In an electric arc welding system, a freely movable welding tool adapted to be held and supported by the operator during the welding operation and having a handle adapted to be grasped by the hand of the operator whereby the operator is enabled to support and manipulate the welding tool, said welding tool having a movable welding electrode, and an electro-responsive device in said tool having a movable part responsive to fluctuations in the welding current to maintain the welding arc at an even heat.

24. In an arc welding system, in combination, a welding pencil subject to the control of an operator's hand and adapted to be brought into contact with a piece of work, a compensating lever carrying said pencil, a resilient device to draw said pencil away from the work, an operator's handle adapted to be wielded manually, carrying an electro-responsive device to approach the pencil to the work, said electro-responsive device being located in a shunt around the arc.

25. In an arc welding system, in combination, a welding pencil subject to the control of an operator's hand and adapted to be brought into contact with a piece of work, a resilient device to draw said pencil away from the work and an operator's handle adapted to be wielded manually carrying an electro-responsive device to control the position of the pencil with relation to the work, said electro-responsive device being located in a shunt around the arc.

26. In an arc welding system, in combination, a welding pencil subject to the control of an operator's hand and adapted to be brought into contact with a piece of work, a resilient device and an operator's handle adapted to be wielded manually, carrying an electro-responsive device to control the position of the pencil with relation to the work, an operator's switch mounted upon said combination adapted to be closed by an operator's hand when grasping said handle, said electro-responsive device being located in a shunt around the arc normally open at two points, one adapted to be closed by said operator's switch and the other including a terminal flexibly connected to said combination and adapted to be brought into contact with the work.

27. In an arc welding system, in combination, a welding pencil subject to the control of an operator's hand and adapted to be brought into contact with a piece of work, a resilient device, an operator's handle carrying an electro-responsive device such as a solenoid coil to control the position of the pencil with relation to the work, said electro-responsive device being located in a shunt around the arc, and an audible signal having electro-responsive operating means located in shunt of said solenoid coil.

28. In an arc welding system, in combination, a welding pencil subject to the control of an operator's hand and adapted to be brought into contact with a piece of work, a resilient device, an operator's handle carrying an electro-responsive device to control the position of the pencil with relation to the work, said electro-responsive device being located in a shunt around the arc, said resilient device and said electro-responsive device being so adjusted to each other and to the current as to maintain substantially a steady arc.

29. In an arc welding system, in combination, a welding pencil subject to the control of an operator's hand and adapted to be brought into contact with a piece of work, a resilient device, and an operator's handle consisting of a hollow cylinder surrounding an electro-responsive device to control the position of the pencil with relation to the work.

30. In an arc welding system, in combination, a welding pencil subject to the control of an operator's hand and adapted to be brought into contact with a piece of work, a resilient device to draw said pencil away from the work, and an operator's handle consisting of a hollow cylinder surrounding an electro-responsive device to approach the pencil to the work.

31. In an arc welding system, in combination, a welding pencil subject to the control of an operator's hand and adapted to be brought into contact with a piece of work, a compensating lever carrying said pencil, a resilient device to draw said pencil away from the work, an operator's handle consisting of a hollow cylinder surrounding an electro-responsive device to approach the pencil to the work and an audible signal mounted upon said combination.

32. In an arc welding system, in combination, a welding pencil subject to the control of an operator's hand and adapted to be brought into contact with a piece of work, a compensating lever carrying said pencil, a resilient device to draw said pencil away from the work, an operator's handle consisting of a hollow cylinder surrounding an electro-responsive device to approach the pencil to the work, an audible signal mounted upon said combination, and an operator's switch mounted upon said handle.

33. In an arc welding system, in combination, a welding pencil subject to the control of an operator's hand and adapted to be brought into contact with a piece of work, a compensating lever carrying said pencil, a signal mounted upon said combination, operated by a limiting contact mounted upon said combination adapted to electrically connect with said lever when the combination is brought too close to the work to inform the operator thereof.

34. In an arc welding system, in combination, a welding pencil subject to the control of an operator's hand and adapted to be brought into contact with a piece of work, a compensating lever carrying said pencil, an audible signal mounted upon said combination operated by a limiting contact mounted upon said combination adapted to connect electrically with said lever when the combination is brought too close to the work to inform the operator thereof.

35. In an arc welding system, in combination, a welding pencil subject to the control of an operator's hand and adapted to be brought into contact with a piece of work, a compensating lever carrying said pencil, an audible signal mounted upon said combination, operated by a limiting contact mounted upon said combination adapted to connect electrically with said lever when the combination is brought too close to the work to inform the operator thereof, said contact being resiliently mounted so as not to interfere with the motion of said lever.

36. In an arc welding system, in combination, a welding pencil subject to the control of an operator's hand and adapted to be brought into contact with a piece of work, a compensating lever carrying said pencil, an operator's handle associated with an electro-responsive device such as a solenoid coil, an audible signal mounted upon said combination operated by a limiting contact mounted upon said combination adapted to connect electrically with said lever when the combination is brought too close to the work to inform the operator thereof, said contact being resiliently mounted so as not to interfere with the motion of said lever.

37. In an electric arc welding system, a handle, a movable welding device combined with an audible signal and a limiting stop to cause the operation of said signal when said welding device drifts beyond the range of position provided with relation to said handle.

38. In an arc welding system, in combination, a welding pencil subject to the control of an operator's hand composed of welding metal and adapted to be brought into contact with a piece of work, a spring clip adapted to frictionally hold said pencil at one end, on one side of its fulcrum, and an electrically influenced magnetic device associated with the other end of said compensating lever upon the other side of said fulcrum, located at a substantially greater distance from said fulcrum than said pencil, and a resilient device to approach the pencil to the work.

39. In an arc welding system, in combination, a welding pencil subject to the control of an operator's hand composed of welding metal and adapted to be brought into contact with a piece of work, a spring clip adapted to frictionally hold said pencil, a compensating lever carrying at one end said pencil on one side of its fulcrum and an electrically influenced magnetic device associated with the other end of said compensating lever upon the other side of said fulcrum located at a substantially greater distance from said fulcrum than said pencil to approach the pencil to the work, and a tension spring to draw said pencil away from the work.

40. In an arc welding system, in combination, a welding pencil subject to the control of an operator's hand and adapted to be brought into contact with a piece of work, a resilient device, means to adjust said resilient device, and an operator's handle carrying an electro-responsive device to control the position of the pencil with relation to the work.

41. In an arc welding system, in combination, a welding pencil subject to the control of an operator's hand and adapted to be brought into contact with a piece of work, a compensating lever carrying said pencil and an electrically influenced magnetic device to approach the pencil to the work, and a resilient device to draw said pencil away from the work.

42. In an arc welding system, in combination, a welding pencil subject to the control of an operator's hand and adapted to be brought into contact with a piece of work, a compensating lever carrying said pencil, an electrically influenced magnetic device to approach the pencil to the work, and a resilient device to draw said pencil away from the work, said resilient device exerting a pull upon said compensating lever at a point close to its fulcrum.

43. In an arc welding system, in combination, a welding pencil subject to the control of an operator's hand and adapted to be brought into contact with a piece of work, a compensating lever carrying at one end said pencil on one side of its fulcrum and an electrically influenced magnetic device associated with the other end of said compensating lever upon the other side of said fulcrum located at a substantially greater distance from said fulcrum than said pencil to approach the pencil to the work and a resilient device to draw said pencil away from the work.

44. In an arc welding system, in combination, a welding pencil subject to the control of an operator's hand and adapted to be brought into contact with a piece of work, a compensating lever carrying said pencil and an electrically influenced magnetic device, a resilient device, an operator's handle, a bracket mounted thereon, said operator's handle surrounding a solenoid coil adapted to attract said magnetic device to control the position of the pencil with relation to the work.

45. In an arc welding system, in combination, a welding pencil subject to the control of an operator's hand and adapted to be brought into contact with a piece of work, a compensating lever carrying said pencil and an electrically influenced magnetic device to approach the pencil to the work, a resilient device to draw said pencil away from the work, and an operator's handle consisting of a hollow cylinder surrounding an electro-responsive device adapted to attract said magnetic device to control the position of the pencil with relation to the work.

46. In an arc welding system, in combination, a welding pencil subject to the control of an operator's hand and adapted to be brought into contact with a piece of work, a spring clip adapted to frictionally and resiliently hold said pencil, a compensating lever carrying said clip on one side of its fulcrum and an electrically influenced magnetic device associated with the other end of said compensating lever to approach the pencil to the work, a resilient device to draw said pencil away from the work, an operator's handle, carrying said fulcrum, said operator's handle surrounding a solenoid coil adapted to attract said magnetic device to control the position of the pencil with relation to the work.

47. In an arc welding system, in combination, a welding pencil subject to the control of an operator's hand and adapted to be brought into contact with a piece of work, a spring clip adapted to frictionally hold said pencil at one end said clip on one side of its fulcrum and an electrically influenced magnetic device associated with the other end of said compensating lever upon the other side of said fulcrum located at a substantially greater distance from said fulcrum than said pencil to approach the pencil to the work, a resilient device to draw said pencil away from the work, an operator's handle, a bracket mounted thereon carrying said fulcrum, said operator's handle surrounding a solenoid coil adapted to attract said magnetic device to control the position of the pencil with relation to the work.

48. In an arc welding system, in combination, a welding pencil subject to the control of an operator's hand and adapted to be brought into contact with a piece of work, a spring clip adapted to frictionally hold said pencil, a compensating lever carrying at one end said clip on one side of its fulcrum and an electrically influenced magnetic device associated with the other end of said compensating lever upon the other side of said fulcrum to approach the pencil to the work, a resilient device to draw said pencil away from the work, an operator's handle, a bracket thereon carrying said fulcrum, said operator's handle surrounding a solenoid coil adapted to attract said magnetic device to control the position of the pencil with relation to the work.

49. In an arc welding system, in combination, a welding pencil subject to the control of an operator's hand and adapted to be brought into contact with a piece of work, a spring clip adapted to frictionally hold said pencil, a compensating lever carrying at one end said clip on one side of its fulcrum and an electrically influenced magnetic device associated with the other end of said compensating lever upon the other side of said fulcrum located at a substantially greater distance from said fulcrum to said pencil to approach the pencil to the work, a resilient device to draw said pencil away from the work, an operator's handle and a bracket mounted thereon carrying said fulcrum, said operator's handle surrounding a solenoid coil adapted to attract said magnetic device to control the position of the pencil with relation to the work, and an operator's switch mounted upon said electro-responsive device, said device being located in a shunt around the arc normally open at two points, one adapted to be closed by said operator's switch, and the other including a terminal flexibly connected to said combination and adapted to be brought into contact with the work.

50. In an arc welding system, in combination, a welding pencil subject to the control of an operator's hand and adapted to be brought into contact with a piece of work, a spring clip adapted to frictionally hold said pencil, a compensating lever carrying at one end said clip on one side of its fulcrum and an electrically influenced magnetic device associated with the other end of said compensating lever upon the other side of said fulcrum located at a substantially greater distance from said fulcrum than said pencil to approach the pencil to work, a resilient device to draw said pencil away from the work, an operator's handle and a bracket thereon carrying said fulcrum, said operator's handle surrounding a solenoid coil adapted to attract said magnetic device to control the position of the pencil with relation to the work and an operator's switch mounted upon said electro-responsive device, said device being located in a shunt around the arc normally open at two points one adapted to be closed by said operator's switch.

51. In an arc welding system, in combination, a welding pencil subject to the control of an operator's hand and adapted to be brought into contact with a piece of work, a compensating lever carrying said pencil, and a resilient device, said resilient device exerting a pull upon said compensating lever at a point close to its fulcrum.

52. In an arc welding system, in combination, a welding pencil subject to the control of an operator's hand and adapted to be brought into contact with a piece of work, a compensating lever carrying at one end said pencil on one side of its fulcrum and an electrically influenced magnetic device associated with the other end of said compensating lever upon the other side of said fulcrum, and a resilient device to draw said pencil away from the work, said resilient device exerting a pull upon said compensating lever at a point close to its fulcrum.

53. In an arc welding system, in combination, a welding pencil subject to the control of an operator's hand and adapted to brought into contact with a piece of work, a compensating lever carrying at one end said pencil on one side of its fulcrum and an electrically influenced magnetic device associated with the other end of said compensating lever upon the other side of said fulcrum located at a substantially greater distance from said fulcrum than said pencil, to approach the pencil to the work, a resilient device to draw said pencil away from the work, said resilient device exerting a pull upon said compensating lever at a point close to its fulcrum, an operator's handle and a bracket thereon carrying said fulcrum, said operator's handle associated with an electro-responsive device adapted to attract said magnetic device to control the position of the pencil with relation to the work.

54. In an arc welding system, in combination, a welding pencil subject to the control of an operator's hand and adapted to be brought into contact with a piece of work and an electrically influenced magnetic device to approach the pencil to the work, an operator's handle, said operator's handle adapted to attract said magnetic device to control the position of the pencil with relation to the work and an operator's switch mounted upon said handle adapted to be closed by an operator's hand when grasping said handle, said electro-responsive device being located in a shunt around the arc normally open at two points one adapted to be closed by said operator's switch.

55. In an arc welding system, in combination, a welding pencil subject to the control of an operator's hand and adapted to be brought into contact with a piece of work, and an electrically influenced magnetic device to approach the pencil to the work, and an operator's hande carrying an electro-responsive device adapted to attract said magnetic device to control the position of the pencil with relation to the work and an operator's switch mounted upon said handle adapted to be closed by an operator's hand when grasping said handle, said electro-responsive device being located in a shunt around the arc in a circuit normally open and adapted to be closed by said operator's switch.

56. In an arc welding system, in combination, a welding pencil subject to the control of an operator's hand and adapted to be brought into contact with a piece of work and an electrically influenced magnetic device to approach the pencil to the work, an operator's handle carrying an electro-responsive device adapted to attract said magnetic device to control the position of the pencil with relation to the work and an operator's switch mounted upon said handle adapted to be closed by an operator's hand when grasping said handle, said electro-responsive device being located in a shunt around the arc normally open at two points one adapted to be closed by said operator's switch and the other including a terminal flexibly connected to said combination and adapted to be brought into contact with the work.

57. In an arc welding system, in combination, a welding pencil subject to the control of an operator's hand and adapted to be brought into contact with a piece of work and an electrically influenced magnetic device to approach the pencil to the work, an operator's handle carrying an electro-responsive device adapted to attract said magnetic device to control the position of the pencil with relation to the work, an audible signal mounted upon said combination and an operator's switch mounted upon said handle adapted to be closed by an operator's hand when grasping said handle, said electro-responsive device being located in a shunt around the arc in a circuit normally open and adapted to be closed by said operator's switch, and said audible signal having electro-responsive operating means located in shunt of said solenoid coil.

58. In an arc welding system, in combination, a welding pencil subject to the control of an operator's hand and adapted to be brought into contact with a piece of work in order that an arc may be drawn, an operator's handle associated with an electro-responsive device adapted to attract said magnetic device to control the position of the pencil with relation to the work, and an audible signal mounted upon said combination, said audible signal having electro-responsive operating means located in shunt of said electro-responsive device.

59. In an arc welding system, in combination, a welding pencil subject to the control of an operator's hand and adapted to be brought into contact with a piece of work and an electrically influenced magnetic device, an operator's handle associated with an electro-responsive device to control the position of the pencil with relation to the work and a signal mounted upon said combination operated by a limiting contact mounted upon said combination adapted to connect electrically with said lever when the combination is brought too close to the work to inform the operator thereof.

60. In an arc welding system, in combination, a welding pencil subject to the control of an operator's hand and adapted to be brought into contact with a piece of work and an electrically influenced magnetic device, an operator's handle associated with an electro-responsive device to control the position of the pencil with relation to the work and an audible signal mounted upon said combination operated by a limiting contact mounted upon said combination adapted to connect electrically with said magnetic device when the combination is brought too close to the work to inform the operator thereof.

61. In an arc welding system, in combination, a welding pencil subject to the control of an operator's hand and adapted to be brought into contact with a piece of work and an electrically influenced magnetic device, an operator's handle associated with an electro-responsive device to control the position of the pencil with relation to the work and an audible signal mounted upon said combination operated by a limiting contact mounted upon said combination adapted to connect electrically with said magnetic device when the combination is brought too close to the work to inform the operator thereof, said contact being resiliently mounted so as not to interfere with the motion of said lever.

62. In an arc welding system, in combination, a welding pencil subject to the control of an operator's hand and adapted to be brought into contact with a piece of work and an electrically influenced magnetic device adapted to reciprocate sluggishly to approach the pencil to the work, a resilient device upon said pencil and an operator's handle associated with an electro-responsive device adapted to attract said magnetic device to control the position of the pencil with relation to the work.

63. In an arc welding system, in combination, a welding pencil subject to the control of an operator's hand and adapted to be brought into contact with a piece of work, a compensating lever carrying said pencil and an electrically influenced magnetic device adapted to reciprocate sluggishly to approach the pencil to the work, a resilient device to draw said pencil away from the work and an operator's handle associated with an electro-responsive device adapted to attract said magnetic device to control the position of the pencil with relation to the work.

64. In an arc welding system, in combination, a welding pencil subject to the control of an operator's hand and adapted to be brought into contact with a piece of work, a compensating lever carrying said pencil on one side of its fulcrum and an electrically influenced magnetic device adapted to reciprocate sluggishly upon the other side of said fulcrum to approach the pencil to the work, a resilient device to draw said pencil away from the work and an operator's handle associated with an electro-responsive device adapted to attract said magnetic device to control the position of the pencil with relation to the work.

65. In an arc welding system, in combination, a welding pencil subject to the control of an operator's hand and adapted to be brought into contact with a piece of work, a compensating lever carrying said pencil and adapted to reciprocate sluggishly.

66. In an arc welding system, in combination, a welding pencil subject to the control of an operator's hand and adapted to be brought into contact with a piece of work, a spring clip adapted to frictionally and resiliently hold said pencil, a compensating lever carrying said pencil on one side of its fulcrum and an electrically influenced magnetic device adapted to reciprocate sluggishly upon the other side of said fulcrum located at a substantially greater distance from said fulcrum than said pencil to approach the pencil to the work, a resilient device to draw said pencil away from the work, said resilient device exerting a pull upon said pencil, an operator's handle carrying said fulcrum, said operator's handle associated with an electro-responsive device adapted to attract said magnetic device to approach the pencil to the work.

67. In an arc welding system, in combination, a welding pencil subject to the control of an operator's hand and adapted to be brought into contact with a piece of work, a spring clip adapted to frictionally and resiliently hold said pencil, a compensating lever carrying said pencil on one side of its fulcrum and an electrically influenced magnetic device adapted to reciprocate sluggishly upon the other side of said fulcrum located at a substantially greater distance from said fulcrum than said pencil to approach the pencil to the work, a resilient device to draw said pencil away from the work, an operator's handle carrying said fulcrum, said operator's handle associated with an electro-responsive device adapted to attract said magnetic device to approach the pencil to the work and an operator's switch mounted upon said handle adapted to be closed by an operator's hand when grasping said handle.

68. In an arc welding system, in combination, a welding pencil subject to the control of an operator's hand and adapted to be brought into contact with a piece of work, an operator's handle associated with an electro-responsive device to control the position of the pencil with relation to the work, said electro-responsive device and handle being concentrically mounted with free air passages between them with inlets and exit passageways for air cooling purposes.

69. In an arc welding system, in combination, a welding pencil subject to the control of an operator's hand and adapted to be brought into contact with a piece of work, a compensating lever for causing the movement of said pencil and an electrically influenced magnetic device to approach the pencil to the work and means opposing said magnetic device to draw said pencil away from the work.

70. In an arc welding system, in combination, a welding pencil subject to the control of an operator's hand and adapted to be brought into contact with a piece of work, an operator's handle associated with an electro-responsive device to control the position of the pencil with relation to the work and means to cause said welding pencil to vibrate in a substantially straight line to and from the work and guiding devices for said element to guide it to and from the work.

71. In an arc welding system, in combination, a welding pencil subject to the control of an operator's hand and adapted to be brought into contact with a piece of work, an operator's handle associated with an electro-responsive device to control the position of the pencil with relation to the work and means to render the motion of said pencil sluggish.

72. In an arc welding system, in combination, a welding pencil subject to the control of an operator's hand and adapted to be brought into contact with a piece of work, an operator's handle associated with an electro-responsive device to control the position of the pencil with relation to the work, and means to render the motion of said pencil sluggish consisting of a dash pot.

73. In an arc welding system, in combination, a welding pencil subject to the control of an operator's hand and adapted to be brought into contact with a piece of work, an operator's handle associated with an electro-responsive device to control the position of the pencil with relation to the work and means to render the motion of said pencil sluggish consisting of a dash pot device having a piston.

74. In an arc welding system, in combination, a welding pencil subject to the control of an operator's hand and adapted to be brought into contact with a piece of work, an operator's handle associated with an electro-responsive device to control the position of the pencil with relation to the work and means to render the motion of said pencil sluggish consisting of a dash pot device having a piston of self lubricating substance.

75. In an arc welding system, in combination, a welding pencil subject to the control of an operator's hand and adapted to be brought into contact with a piece of work, a compensating lever carrying said pencil adapted to reciprocate sluggishly, a magnetic core, an operator's handle associated with an electro-responsive device to control the position of the pencil with relation to the work and means to render the motion of said pencil sluggish consisting of a dash pot device having a piston of carbon linked to said core.

76. In an arc welding system, in combination, a welding pencil subject to the control of an operator's hand and adapted to be brought into contact with a piece of work, a compensating lever carrying said pencil and an electrically influenced magnetic device, an operator's handle associated with an electro-responsive device to control the position of the pencil with relation to the work and means to render the motion of said pencil sluggish consisting of a dash pot device having a piston of carbon linked to said compensating lever.

77. In an arc welding system, in combination, a welding pencil subject to the control of an operator's hand and adapted to be brought into contact with a piece of work, a compensating lever carrying at one end said pencil and an electrically magnetic device, an operator's handle associated with an electro-responsive device to control the position of the pencil with relation to the work and means to render the motion of said pencil sluggish and consisting of a dash pot and device having a piston of carbon linked to said compensating lever within the spool of said electro-responsive device.

78. In an arc welding system, in combination, a welding pencil subject to the control of an operator's hand and adapted to be brought into contact with a piece of work, an operator's handle associated with an electro-responsive device to control the position of the pencil with relation to the work and magnetic flanges for the spool of said electro-responsive device, the flanges surrounding the movable core being spaced therefrom to prevent magnetic interference with its action.

79. In an electric arc welding system, a handle, a movable welding device combined with an audible signal and a limiting stop to cause the operation of said signal when said welding device drifts out of position with relation to said handle.

80. In an arc welding system, in combination, a welding pencil subject to the control of an operator's hand and adapted to be brought into contact with a piece of work to establish an arc, a compensating lever, mounting said pencil, electro-responsive means to influence the operation of said lever in its relation to the arc and a resilient device opposing said electro-responsive device and so located with relation to said compensating lever as to maintain an even resilient effect throughout the range of motion of said compensating lever.

81. In an electric welding system, in combination, a welding pencil subject to the control of an operator's hand and adapted to be brought normally into contact with a piece of work, a compensating lever adapted to cause the movement of said pencil, an electrically influenced magnetic device adapted to actuate said lever to approach the pencil to the work, and a tension spring opposing said magnetic device to draw said pencil away from the work.

82. In an electric arc welding system, a freely movable handle adapted to be grasped by the hand of an operator and carrying a movable welding electrode, an electro-responsive device mounted thereon having a movable part to maintain the welding arc at an even heat and means to minimize the range of movement of said electrode with relation to that of the movable part of said electro-responsive device.

83. In an electric arc welding system, a freely movable handle adapted to be grasped by the hand of an operator and carrying a movable welding electrode, an electro-responsive device mounted thereon having a movable part to maintain the welding arc at an even heat and resilient means to evenly oppose the influence of said electro-responsive device regardless of the relative positions of said movable part and of said electrode.

ERNST WOLTMANN.

Witnesses:
FREDERICK T. SASS,
H. D. PENNEY.